United States Patent [19]  [11] 4,335,218
DeGuiseppi  [45] Jun. 15, 1982

[54] PROCESS FOR THE PREPARATION OF A FOAM-CORED LAMINATE HAVING METAL FACERS AND RIGID POLYISOCYANURATE FOAM CORE PREPARED IN THE PRESENCE OF A DIPOLAR APROTIC ORGANIC SOLVENT

[75] Inventor: David T. DeGuiseppi, Hamden, Conn.

[73] Assignee: The Upjohn Company, Kalamazoo, Mich.

[21] Appl. No.: 201,137

[22] Filed: Oct. 27, 1980

[51] Int. Cl.$^3$ .............................................. C08G 18/14
[52] U.S. Cl. ............................... 521/99; 156/78; 156/79; 156/331.4; 427/373; 428/422.8; 521/107; 521/121; 521/128
[58] Field of Search ................ 521/99, 107, 121, 128; 156/78, 79, 331.4; 427/373; 428/422.8

[56] References Cited

U.S. PATENT DOCUMENTS

| | | | |
|---|---|---|---|
| 3,625,872 | 12/1971 | Ashida et al. | 528/48 |
| 3,746,709 | 7/1973 | Patton et al. | 521/129 |
| 3,849,349 | 11/1974 | Frisch et al. | 521/129 |
| 3,896,052 | 7/1975 | Lockwood et al. | 252/431 C |
| 3,903,018 | 9/1975 | Kolakowski et al. | 252/431 C |
| 3,940,517 | 2/1976 | DeLeon | 427/373 |
| 4,024,310 | 5/1977 | Wooler et al. | 428/313 |
| 4,025,687 | 5/1977 | Wooler et al. | 428/310 |
| 4,033,908 | 7/1977 | Hopkins et al. | 521/902 |
| 4,071,482 | 1/1978 | Hopkins et al. | 521/903 |
| 4,204,019 | 5/1980 | Parker | 428/310 |

Primary Examiner—Maurice J. Welsh
Attorney, Agent, or Firm—Denis A. Firth; John Kekich

[57] ABSTRACT

Improved adhesion between the skin and core of laminates having rigid polyisocyanurate foam cores is obtained by incorporating a dipolar aprotic organic solvent, in minor amount, into the reaction mixture employed to prepare the polyisocyanurate foam core.

6 Claims, No Drawings

4,335,218

PROCESS FOR THE PREPARATION OF A FOAM-CORED LAMINATE HAVING METAL FACERS AND RIGID POLYISOCYANURATE FOAM CORE PREPARED IN THE PRESENCE OF A DIPOLAR APROTIC ORGANIC SOLVENT

BACKGROUND OF THE INVENTION

1. Field of the Invention

This invention relates to laminates having metallic or non-metallic facers and polymer foam cores and is more particularly concerned with laminates having polyisocyanurate foam cores.

2. Description of the Prior Art

The preparation of laminates having rigid or flexible facers such as aluminum foil, sheet steel, gypsum board asphalt-saturated felt, wood, kraft paper, and the like, and polyisocyanurate foam cores is well-known in the art; see, for example, U.S. Pat. Nos. 3,940,517; 4,024,310; 4,025,687; and 4,204,019. In order to obtain good adhesion between the facer sheets and the foam core it is generally necessary to expose the laminate to relatively high temperatures, of the order of about 160°–250° F. or higher, for a period of time (of the order of 1–20 minutes). This requires the consumption of significant amounts of energy both when the laminates are being produced continuously using high speed production equipment or when individual panels are being produced in a batch type molding operation.

We have now found that the curing temperature required to ensure good adhesion between skin facers and foam core can be substantially reduced by introducing carefully controlled quantities of organic dipolar aprotic solvents into the polyisocyanurate foam forming reaction mixtures employed in the preparation of the laminate core. We have also found that such introduction of organic polar solvents has additional benefits which will be discussed in more detail hereafter.

The introduction of certain organic polar solvents into polyisocyanurate foam forming mixtures, for example as a part of the catalyst component, has been described hitherto but the amounts so introduced have been significantly less than the amounts required in the present context; see, for example, U.S. Pat. Nos. 3,625,872; 3,746,709; 3,849,349; 3,896,052; 3,903,018; 4,033,908 and 4,071,482.

SUMMARY OF THE INVENTION

This invention comprises an improved process for the preparation of foam-cored laminates having a rigid polyisocyanurate foam as the core material wherein the improvement comprises incorporating, into the polyisocyanurate foam forming reaction mixture which is employed to prepare the foam core, a dipolar aprotic organic solvent in an amount up to about 10 percent by weight based on total weight of the foam forming reaction mixture.

The invention also comprises the laminates produced by the improved process of the invention.

DETAILED DESCRIPTION OF THE INVENTION

The laminates are produced in accordance with the invention using any of the techniques known in the art for the preparation of laminates having a polyisocyanurate foam core and rigid or flexible skins, the only change of any significance being the inclusion, in the reaction mixture employed to prepare the polyisocyanurate foam core, of a dipolar aprotic organic solvent in an amount within the range set forth above, i.e. in an amount corresponding to up to about 10 percent by weight of the total foam forming reaction mixture.

The minimum amount of dipolar aprotic solvent which must be added to the foam forming reaction mixture in order to achieve the results described above is dependent on the particular solvent employed in any instance and, more particularly, on the temperature which is to be used to cure the laminate derived using the foam forming reaction mixture. In general it is found that, using curing temperatures of the order of 150° F. or higher, it is possible to achieve the desired result using amounts of dipolar aprotic solvent as low as about 1 percent by weight based on total weight of foam forming reaction mixture. When curing temperatures lower than about 150° F. are used, it is necessary to increase the amount of dipolar aprotic solvent in order to ensure success. Thus, as is shown in Example 1 below, in the case of the use of dimethylformamide as the dipolar aprotic solvent, it is necessary to employ a minimum of about 3 percent by weight, based on total weight of foam forming mixture, in order to achieve the desired result at a cure temperature of 120° F. When the cure temperature is lowered to about 100° F. the proportion of dipolar aprotic solvent required to achieve the desired result is even higher and is of the order of about 4 percent by weight based on total weight of the foam forming mixture. The upper limit of proportion of the dipolar aprotic solvent is not critical and is governed largely by economic considerations.

The term "dipolar aprotic organic solvent" is used throughout this specification and claims in its conventionally accepted sense, namely, as designating a solvent which cannot donate a suitably labile hydrogen atom or atoms to form strong hydrogen bonds with an appropriate species (or to react with a polyisocyanate); see, for example, Parker, Quarterly Reviews XVI, 163, 1962. Illustrative of dipolar organic solvents are dialkyl sulfoxides such as dimethyl sulfoxide, diethyl sulfoxide, diisobutyl sulfoxide, and the like; N,N-dialkylalkanoamides such as N,N-dimethylformamide, N,N-dimethylacetamide, N,N-diethylacetamide and the like; phosphonates such as O,O-dimethyl, O,O-diethyl, O,O-diisopropyl methylphosphonates, O,O-di(2-chloroethyl) vinylphosphonate, and the like; tetramethylenesulfone, 1-methyl-2-pyrrolidinone, trialkyl phosphates such as trimethyl and triethyl phosphates, acetonitrile, and the like.

The known methods for production of laminates include production of individual sandwich panels as well as continuous foam laminate board production. In the former process the foam forming reaction mixture is dispensed, generally using appropriate mechanical mixing and dispensing means, between two facer sheets which have been pre-assembled in an appropriate mold. The dispensing of the foam mixture can be accomplished by pouring or spraying in accordance with well-known techniques.

In the continuous method the polymer foam forming reaction mixture is dispensed on to a lower facing sheet which is flexible and is being continuously drawn from a supply roll and advanced on a supporting belt. Downstream from the point at which the foam forming mixture is deposited on to the lower facing sheet, a second facing sheet, dispensed from a continuous roll in the case of flexible facer material such as aluminum sheet, asphalt-saturated felt, kraft paper, and the like or dispensed in the form of individual plates in the case of a rigid facer such as sheet steel, gypsum board wood panels and the like is brought into contact with the upper surface of the rising foam. In general, the second facer sheet is brought into contact with the foam at the stage at which the foam forming reaction has progressed to such an extent that the foam has acquired sufficient strength to support the weight of the second facer sheet. After the completion of this step, the laminate is then passed through a shaping device to control thickness and finally through a curing zone in which the foam-cored laminate is subjected to temperatures of the order of about 200° F. This heat curing step is generally required in order to ensure adequate bonding of the foam core to the abutting surfaces of the facer sheets in addition to effecting cure of the foam core itself.

Similarly, in the case of the foam core panels which are formed by the pour-in-place method in individual molds as described above, the panels are subjected to a heat curing process, involving the use of temperatures of the order of 180° F. in order to ensure adequate bonding of the foam core to the abutting surfaces of the facer sheets as well as completion of the cure of the foam core itself.

The polymer foam forming reaction mixtures employed in the preparation of polyisocyanurate foam-cored laminates in accordance with the procedures outlined above comprise a polyisocyanate, a minor amount (usually less than about 0.5 equivalents per equivalent of polyisocyanate) of a polyol, a trimerizing catalyst (i.e. a catalyst for trimerizing an isocyanate to form isocyanurate linkages) and a blowing agent. The various components are brought together and mixed using manual or mechanical mixing means to form the foam reaction mixture. Generally, the polyol and catalyst are preblended to form a single component which is fed as one stream to a conventional mixing head and admixed with the polyisocyanate which is fed as a separate stream to the mixing head. The blowing agent, which can be water (which generates carbon dioxide by reaction with isocyanate) or a volatile solvent such as the lower molecular weight halogenated aliphatic hydrocarbons of which trichlorofluoromethane is typical, can be fed as a separate stream to the mixing head or blended with one or other, or both, of the other components prior to feeding the latter to the mixing head.

In carrying out the process of the invention it is merely necessary to add the appropriate quantity (within the range set forth above) of the dipolar aprotic solvent to the polyisocyanate or to the polyol component or, if desired, to split the solvent between each of the two components. Having included the solvent in the form reaction mixture in this manner, the production of the laminate can then proceed using any of the methods known in the art without the necessity to modify or change any of the conventionally used procedures.

It has been found that, by so incorporating the dipolar aprotic solvents in the foam forming reaction mixtures, it is possible to obtain excellent adhesion of foam core to facer skin without the necessity to use curing temperatures of the above-mentioned order. This holds true for a wide range of thickness of the foam core from as little as about 0.5 inches to as high as 4 inches or greater. Thus, it has been found that curing temperatures as low as 100° F. are entirely adequate for obtaining good adhesion when employing the improvement of the present invention. It has also been observed that the friability of the polyisocyanurate foam core in the layer immediately abutting the skin facers is significantly less than is the case where a polymer foam reaction mixture, identical in composition except for the absence of the dipolar aprotic solvent, has been used.

Any of the polyisocyanates conventionally employed in the art of preparing polyisocyanurate foams can be employed in the foam reaction mixtures discussed above. A particularly preferred group of polyisocyanates are those known comprehensively as polymethylene polyphenyl polyisocyanates. The latter can contain from about 20 to about 85 percent by weight of methylenebis(phenyl isocyanate) the remainder of the mixture being polymethylene polyphenyl polyisocyanates of functionality greater than 2.0. A detailed description of these polyisocyanates and methods for their preparation is found in U.S. Pat. No. 3,745,133.

Similarly, any of the polyols conventionally employed in the production of polyisocyanurate foams can be employed in the foam reaction mixture employed in preparing laminates in accordance with this invention. Such polyols include polyether and polyester polyols having functionalities from 2 to 6 and molecular weights from about 60 up to about 1000 or higher. While polyols having higher molecular weights can be employed, they tend to be solids or highly viscous liquids and are accordingly less desirable because of handling and miscibility considerations.

The polyols are generally employed in the foam forming reaction mixture in amounts in the range of about 0.01 equivalents to about 0.4 equivalents per equivalent of polyisocyanate. A detailed description and exemplification of such polyols is given in the aforesaid U.S. Pat. No. 3,745,133.

It has been found that the problem of adhesion of polymer foam core to facer sheet, and the necessity to employ relatively high temperatures to overcome the problem, exists to varying degrees using any of the polyols conventionally employed in making polyisocyanurate foams. The problem in all cases can be alleviated, i.e. the cure temperature necessary to achieve adequate adhesion can be lowered, by the means provided by this invention. However, it has been found further that the problem in regard to the adhesion between foam core and facer sheet is particularly acute in the case of a particular type of polyol the use of which otherwise provides highly beneficial properties in the foam core such as low smoke evolution, high compressive strength and, very importantly, the formation of a protective intumescent char over unburnt foam when the foam is subjected to combustion. The polyols in question are those which are obtained by transesterification, using a glycol of molecular weight from about 60 to about 400, of a residue remaining after dimethyl terephthalate and methyl p-toluate have been removed from a dimethyl terephthalate esterified oxidate reaction product. The major portion of the residue in question comprises a mixture of methyl and benzyl esters of di- and tricarboxylic acids of benzene and diphenyl. The above type of product is described in detail in U.S. Pat. No. 3,647,759.

Fortunately, however, it is found that the problem with the use of the above type of polyol responds well to the remedy provided by the process of the invention. Thus, using the latter it is possible to obtain laminates having excellent adhesion of facer skin to foam core using polyols of the above type in the foam reaction mixture without having to utilize excessively high temperatures for curing of the laminate.

The trimerization catalysts, and the proportions thereof, which are employed in the polymer foam reaction mixtures utilized in accordance with the invention can be any of those known in the art; see, for example, the aforesaid U.S. Pat. No. 3,745,133 as well as U.S. Pat. Nos. 3,896,052; 3,899,443 and 3,903,018.

The process of the invention can be applied to the preparation of laminates using any of the types of facer material (such as those exemplified above) and the advantages of improved adhesion will be manifested. However, the problem of poor adhesion is particularly acute in the case of the various metal facers and it is with metallic facers that the process of the invention finds particular application.

The laminates produced in accordance with the process of the invention can be used for all purposes for which such laminates are conventionally used. Illustratively, the laminates can be employed as thermal barriers and insulation materials in roof decks and as wall insulation in all types of construction in industrial buildings, cold storage areas and the like.

The following examples described the manner and process of making and using the invention and set forth the best mode contemplated by the inventor of carrying out the invention but are not to be construed as limiting.

EXAMPLE 1

A series of model rigid-faced sandwich panels with polyisocyanurate foam cores was prepared using the following standard procedure.

Two 24 gauge galvanized steel plates (14"×14") were disposed symmetrically, and held in place by four C clamps, on either side of a three-sided square frame formed by three aluminum rails of thickness 4" and length 12". The assembly so obtained comprised the two parallel steel plates spaced apart by 4" and having disposed between them a mold cavity measuring 12"×12"×4". The assembly was placed in an oven, at the temperature specified in Table I below, and stabilized to the temperature of the oven. The assembly was then removed from the oven and, with the two parallel steel plates in a vertical plane and with the open end of the mold cavity facing upwards, sufficient polyisocyanurate foam forming mixture (prepared as described below from the components and proportions shown in Table 1 below) was poured into the mold so that the risen foam would entirely fill the mold cavity and slightly overflow the top of same. The mold was immediately returned to the oven and the foam was allowed to rise freely in the mold. The whole assembly was thus allowed to remain in the oven for 5 minutes at the temperature stated in Table 1. The foam cured sandwich panel so obtained was then removed from the oven, the C clamps and the aluminum rails were removed and the panel was allowed to stand for a short period before testing qualitatively the strength of the bond between the steel plates and the foam core.

In the case of control panel A (no solvent used; see Table I) there was no significant adhesion between the plates and the core. After panels B and C had been "demolded" and allowed to stand for 10 minutes the bond between the foam core and plates failed completely. In the case of panel D there was good adhesion and the steel plates could not be separated from the core by applying reasonable manual force. When the steel plates of this panel were subjected to sufficient force to pull them apart and rupture the foam core, it was found that rupture occurred in the body of the foam core and not at the bond between the core and the steel plates. Further, it was found that no significant friable layer was observed adjacent the bond between the steel plates and the foam core in the case of panel D whereas a friable layer at this same location was clearly observable in the case of panels A, B and C.

The polymer foam forming reaction mixture for each of the panels was formed, using the ingredients and proportions (all parts by weight) shown in Table 1, in accordance with the following procedure. Components A and B were each separately blended by hand mixing of the various ingredients shown in Table 1 and then the two blends (at 72° F.) were brought together in a 2 quart plastic tub and subjected to high shear mixing for 10 seconds using a high speed drill press fitted with a Conn blade. At the end of the mixing period the reaction mixture was poured into the mold cavity as described above.

TABLE 1

| Foam ingredients | Panel A | Panel B | Panel C | Panel D |
|---|---|---|---|---|
| Component A: | | | | |
| Polyisocyanate[1] | 134 | 134 | 134 | 134 |
| Organosilicone surfactant[2] | 1 | 1 | 1 | 1 |
| Monofluorotrichloromethane | 27 | 27 | 27 | 27 |
| Component B: | | | | |
| Polyol[3] | 30 | 32.5 | 32.5 | 32.5 |
| Organosilicone surfactant[4] | 0.8 | 1.0 | 1.0 | 1.0 |
| Monofluorotrichloromethane | 3.0 | 4.0 | 4.0 | 4.0 |
| Catalyst | 7.25[5] | 5.25[6] | 5.25[6] | 5.25[6] |
| Dimethylformamide | 0 | 1.5 | 3.54 | 5.7 |
| % w/w Dimethylformamide in mix | 0.28 | 1.0 | 2.0 | 3.0 |
| Oven temp. °F. | 150 | 120 | 120 | 120 |

Footnotes to TABLE 1:
[1]Polymethylene polyphenyl polyisocyanate; isocyanate equivalent = 139. Average functionality = 3.0; viscosity 700 cps. at 25° C.
[2]L-5340: Union Carbide
[3]An aromatic polyester polyol derived by transesterification with diethylene glycol of a mixture of polycarbomethoxy substituted benzenes, diphenyls, polyphenyls, and benzyl esters of the toluate family; equivalent wt. = 130
[4]DC-193; Dow Corning Corporation
[5]Mixture of:
(a) 5 parts by weight of Curithane® 51; a liquid polyisocyanurate foam catalyst: The Upjohn Company.
(b) 2 parts by weight of Curithane® 52; a liquid polyisocyanurate foam catalyst: The Upjohn Company.
(c) 0.25 parts by weight of Polycat® 8: Abbott Laboratories.
[6]A blend of the same three components employed in the mixture of Footnote 5 but having only 3 parts by weight of component (a).

EXAMPLE 2

Using the apparatus and procedure described in Example 1 and the foam forming ingredients (and proportions) shown for Panel D in Table 1, with the exception that the amount of polyol was 30 parts by weight and the 5.7 parts by weight of dimethylformamide was replaced by 5.0 parts by weight of dimethylsulfoxide, there was obtained a sandwich panel which, after heating at 120° F. in an oven for 5 minutes, showed good adhesion between the galvanized sheet steel skins and foam core.

EXAMPLE 3

Using the apparatus and procedure described in Example 1 and the foam ingredients and proportions (all parts by weight) shown in Table 2 below, there was prepared three sandwich panels identified as Panels E, F and G. The panels were heat cured for 5 minutes in an oven at the temperatures stated in Table 2. It was found that Panel E (prepared in the absence of dipolar aprotic solvent in the foam core) showed very poor adhesion between the metal facers and the core whereas Panels F and G, both prepared using the dipolar aprotic solvent and cured at different temperatures, showed excellent adhesion between the metal facers and the core.

TABLE 2

| Foam ingredients | Panel E | Panel F | Panel G |
|---|---|---|---|
| Component A | | | |
| Polyisocyanate[1] | 134 | 134 | 134 |
| Organosilicone surfactant[1] | 1 | 1 | 1 |
| Monofluorotrichloromethane | 29 | 29 | 29 |
| Tri(chloroethyl)phosphate | 12 | 12 | 12 |
| Component B | | | |
| Polyol[1] | 32.5 | 32.5 | 32.5 |
| Organosilicone surfactant[1] | 1.0 | 1.0 | 1.0 |
| Catalyst[1] | 7.25 | 7.25 | 7.25 |
| Monofluorotrichloroethane | 4.0 | 4.0 | 4.0 |
| O,O-dimethyl methylphosphonate[2] | 0 | 5.0 | 5.0 |
| % w/w of O,O-dimethyl methylphosphonate | 0 | 2.2 | 2.2 |
| % w/w of dimethylformamide (ex catalyst) | 0.25 | 0.25 | 0.25 |
| Oven temp. °F. | 120 | 120 | 100 |

Footnotes
[1]Same as Example 1, Footnote 5.
[2]Fyrol DMMP: Stauffer Chemical Company.

I claim:

1. In a process for the preparation of a foam-cored laminate having metal facers and rigid polyisocyanurate foam as the core material the improvement which comprises lowering the cure temperature necessary to assure good adhesion between metal facer and foam core by incorporating, into the polyisocyanurate foam forming reaction mixture which is employed to prepare the foam core, a dipolar aprotic solvent in an amount from about 1 percent by weight to about 10 percent by weight based on total weight of the foam forming mixture.

2. A process according to claim 1 wherein the dipolar aprotic organic solvent is dimethylformamide.

3. A process according to claim 1 wherein the dipolar aprotic organic solvent is O,O-dimethyl methylphosphonate.

4. A process according to claim 1 wherein the dipolar aprotic organic solvent is dimethylsulfoxide.

5. A process according to claim 1 wherein the polyisocyanurate foam forming reaction mixture comprises a polymethylene polyphenyl polyisocyanate, a minor amount, based on equivalents per equivalent of polyisocyanate, of a polyol, a blowing agent and a trimerization catalyst.

6. A process according to claim 5 wherein the polyol in the polyisocyanurate foam forming reaction mixture comprises a polyol mixture prepared by the transesterification, with a glycol of molecular weight from about 60 to about 400, of a residue remaining after dimethyl terephthalate and methyl p-toluate have been removed from a dimethyl terephthalate esterified oxidate reaction product.

* * * * *